(12) United States Patent
Abiri et al.

(10) Patent No.: US 9,831,957 B2
(45) Date of Patent: Nov. 28, 2017

(54) SELF-EQUALIZING PHOTO DETECTOR

(71) Applicant: California Institute of Technology, Pasadena, CA (US)

(72) Inventors: Behrooz Abiri, Pasadena, CA (US); Seyed Ali Hajimiri, Pasadena, CA (US); Firooz Aflatouni, Philadelphia, PA (US); Andy Zhou, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 103 days.

(21) Appl. No.: 14/716,735

(22) Filed: May 19, 2015

(65) Prior Publication Data

US 2015/0331193 A1    Nov. 19, 2015

Related U.S. Application Data

(60) Provisional application No. 62/065,240, filed on Oct. 17, 2014, provisional application No. 62/000,413, filed on May 19, 2014.

(51) Int. Cl.
| | |
|---|---|
| *G02B 6/26* | (2006.01) |
| *H04B 10/67* | (2013.01) |
| *G02B 6/28* | (2006.01) |
| *G02B 6/293* | (2006.01) |

(52) U.S. Cl.
CPC ......... *H04B 10/671* (2013.01); *G02B 6/2861* (2013.01); *G02B 6/29352* (2013.01); *G02B 6/2935* (2013.01)

(58) Field of Classification Search
CPC ...... H04B 10/671; H04B 10/66; H04B 10/67; H04B 10/2507
See application file for complete search history.

(56) References Cited

U.S. PATENT DOCUMENTS

| 8,983,244 B2 * | 3/2015 | Shen .......................... G02F 2/00 385/14 |
| 9,590,730 B2 * | 3/2017 | Liu .................... H04B 10/2507 |
| 2016/0277119 A1 | 9/2016 | Sinsky et al. |

OTHER PUBLICATIONS

Streshinsky, et al., "The Road to Affordable, Large-Scale Silicon Photonics," *Opt. Photon. News*, 24(9):32-39, (2013). [Retrieved from the Internet May 11, 2017: <https://www.osapublishing.org/opn/viewmedia.cfm?uri=opn-24-9-32&seq=0>].

(Continued)

*Primary Examiner* — Tony Ko
(74) *Attorney, Agent, or Firm* — Alston & Bird LLP

(57) ABSTRACT

A self-equalizing photo-detector (SEPD) includes, in part, a multitude of optical splitters and photo detectors, and at least one optical delay element. The first optical splitter splits an optical signal into second and third optical signals. The optical delay element delays the second optical signal to generate a fourth optical signal. The second optical splitter splits a signal representative of the fourth optical signal to generate fifth and sixth optical signals. The first photo detector receives the third optical signal via a first optical path, has an anode terminal coupled to an output terminal of the detector and a cathode terminal coupled to a first supply voltage. The second photo detector receives the sixth optical signal via a second optical path, has an anode terminal coupled to a second supply voltage and a cathode terminal coupled to the output terminal of the detector.

45 Claims, 9 Drawing Sheets

(56) References Cited

OTHER PUBLICATIONS

Gondi, et al., "Equalization and Clock and Data Recovery Techniques for 10-Gb/s CMOS Serial-Link Receivers," *IEEE J. Of Solid-State Circuits*, 42(9):1999-2011, (2007).

Lu, et al., "Ultra Low Power VCSEL for 35-Gbps 500-m OM4 MMF Transmissions Employing FFE/DFE Equalization for Optical Interconnects," Optical Fiber Communication Conference 2013, OSA Technical Digest, Paper JTh2a.75, 3 pages (2013).

Zhao, et al., "Tunable Optical Equalizer Using Diffraction Grating Filters," *IEEE Photonics Technology Letters*, 20(18):1590-1592, (2008).

Rosenberg, et al., "Ultra-low-volrage Micro-ring Modulator Inregrated with CMOS Feed-forward Equalization Driver," Optical Fiber Communication Conference, Optical Society of America, 3 pages, (2011).

Abiri et al., "A Self-Equalizing Photo Detector," IEEE Photonics Conference, 2 pages, (2014).

Philpott, et al., "A 20Gb/s SerDes Transmitter with Adjustable Source Impedance and 4-tap Feed-Forward Equalization in 65nm Bulk CMOS," IEEE Custom Integrated Circuits Conference, 623-626, (2008).

Chu, et al., "Compact 1 x N thermo-optic switches based on silicon photonic wire waveguides," *Optics Express*, 13(25):10109-10114, (2005). [Retrieved from the Internet May 11, 2017: <https://www.osapublishing.org/DirectPDFAccess/C295D88D-C681-84A3-BF6DD4C4BB48COAD_86452/oe-13-25-10109.pdf?da=1&id=86452&seq=0&mobile=no>].

\* cited by examiner

US 9,831,957 B2

SELF-EQUALIZING PHOTO DETECTOR

CROSS-REFERENCES TO RELATED APPLICATIONS

The present application claims benefit under 35 USC 119 (e) of U.S. provisional Application No. 62/000,413, filed May 19, 2014, entitled "Self-Equalizing Photo Detector", and U.S. provisional Application No. 62/065,240, filed Oct. 17, 2014, entitled "Adjustable Self-Equalizing Photo Detector", the contents of which are incorporated herein by reference in their entirety.

BACKGROUND OF THE INVENTION

Despite advances in co-integration of electronics and photonics on the same substrate in silicon substrate, the implementation cost of optical communication channels remains an impediment to broad deployment of high speed optical systems for short range front-end of communication networks.

Active optical cables have become widely available in data centers and high performance computing clusters. The main bottleneck limiting the data rate in such cables is the bandwidth of the electro-optical components, such as the optical modulator and photodiodes.

The proliferation of high bandwidth applications such as streaming video has resulted in high demand for faster data communication. Copper based communication channels are being replaced with superior optical fiber channels that provide more bandwidth. As a result, the communication speed bottleneck is moving from communication channel to the electro-optical interfaces.

One technique to compensate for copper channel bandwidth limitation and to mitigate the limited bandwidth of electro-optical components is equalization. While integrated electronic circuits continue to operate at higher speeds, they still face challenges in keeping up with the bandwidth required for equalization.

BRIEF SUMMARY OF THE INVENTION

A detector, in accordance with one embodiment of the present invention includes, in part, a pair of optical splitters, an optical delay element, and a pair of photo detectors. The first optical splitter is adapted to split an optical signal into second and third optical signals. The optical delay element is adapted to delay the second optical signal to generate a fourth optical signal. The second optical splitter is adapted to split a signal representative of the fourth optical signal to generate fifth and sixth optical signals. The first photo detector is adapted to receive the third optical signal via a first optical path. The first photo detector has an anode terminal coupled to an output terminal of the detector and a second terminal coupled to a first supply voltage. The second photo detector is adapted to receive the sixth optical signal via a second optical path. The second photo detector has an anode terminal coupled to a second supply voltage and a cathode terminal coupled to the output terminal of the detector.

In one embodiment, the first photo detector is further adapted to receive the fifth optical signal via a third optical path. In one embodiment, each optical splitter is an adjustable optical splitter. Such embodiments include, in part, a control unit controlling the amount of optical power that the first optical splitter delivers to the second and third and optical signals. In one embodiment, the control unit causes the second optical splitter to deliver either the fifth optical signal to the first photo detector or the sixth optical signal to the second photo detector.

In one embodiment, the first photo detector is a dual-port photo detector adapted to receive the third optical signal from a first input port disposed along its first side, and the fifth optical signal from a second input port disposed along its second side. In one embodiment, each of the first and second splitters is a directional coupler/splitter.

In one embodiment, each of the first and second optical splitters includes, in part, a Mach-Zander interferometer. In one embodiment, each of the first and second optical splitters includes, in part, a first resistive element adapted to heat a first arm of the Mach-Zander interferometer disposed therein, and a second resistive element adapted to heat a second arm of the Mach-Zander interferometer disposed therein. The first and second resistive elements are responsive to the control unit.

In one embodiment, each of the first and second optical splitters includes, in part, a P-I-N diode adapted to change relative phases of the optical signals traveling in first and second arms of the Mach-Zander interferometer in response to the control unit. In one embodiment, each of the first and second optical splitters includes, in part, a P-N diode adapted to change relative phases of the optical signals traveling in first and second arms of the Mach-Zander interferometer in response to the control unit. In one embodiment, a grating coupler receives and couples the first optical signal to the detector. In one embodiment, the detector is integrated in a semiconductor substrate. In one embodiment, the first optical signal is received from a laser.

A method of equalizing a signal, in accordance with one embodiment of the present invention includes, in part, splitting a first optical signal into second and third optical signals, delaying the second optical signal to generate a fourth optical signal, splitting a signal representative of the fourth optical signal to generate fifth and sixth optical signals, providing a first optical path for carrying the third optical signal to a first photo detector having an anode terminal coupled to an output terminal of the detector and a second terminal coupled to a first supply voltage, and providing a second optical path for carrying the sixth optical signal to a second photo detector having an anode terminal coupled to a second supply voltage and a cathode terminal coupled to the output terminal of the detector.

The method, in accordance with one embodiment of the present invention further includes, in part, providing a third optical path for carrying the fifth optical signal to the first photo detector. The method further includes, in part, varying an amount of optical power of the second and third and optical signals. The method further includes, in part, selecting between delivering either the fifth optical signal to the first photo detector via the second optical path, or delivering the sixth optical signal to the second photo detector via the third optical path.

In one embodiment, the first photo detector is a dual-port photo detector adapted to receive the third optical signal from a first input port disposed along a first side of the photo detector, and the fifth optical signal from a second input port disposed along a second side of the photo detector. The method further includes, in part, splitting the first optical signal into the second and third optical signals via a directional coupler/splitter. The method further includes, in part, splitting the first optical signal into the second and third optical signals via a first Mach-Zander interferometer, and splitting the fourth optical signal into the fifth and sixth optical signals via a second Mach-Zander interferometer.

In one embodiment, each of the first and second optical splitters includes, in part, a first resistive element adapted to heat a first arm of the Mach-Zander interferometer disposed in the optical splitter, and a second resistive element adapted to heat a second arm of the Mach-Zander interferometer disposed in the optical splitter. The method, in accordance with one embodiment of the present invention, further includes, in part, splitting the first optical signal into the second and third optical signals via one or more P-I-N or P-N diodes, and splitting the fourth optical signal into the fifth and sixth optical signals via one or more P-I-N or P-N diodes.

In one embodiment, the equalization method is performed using an equalizer integrated in a semiconductor substrate. In one embodiment, the first optical signal is received from a laser via a grating coupler.

A detector, in accordance with one embodiment of the present invention includes, in part, a multitude of optical splitters, optical delay elements, optical paths, and dual-input port photo detectors. Each optical splitter includes, in part, a pair of output ports. A first subset of the optical splitters is adapted to vary the amount of optical power the optical splitter(s) delivers to one of its output ports in response to a control signal. Each optical splitter that is not in the first subset is adapted to deliver an optical signal either to its first output port or to its second output port in response to a control signal. The optical delay elements are disposed between the optical splitters to delay the optical signals travelling between the optical splitters.

A first subset of the dual-input port photo detectors supplies an electrical current to an output terminal of the detector in response to the optical signal(s) the subset receives. A second subset of the dual-input port photo detectors, not in the first subset, draws an electrical current from the output terminal of the detector in response the optical signal(s) the second subset receives. An optical path couples an output port of at least one of the optical splitters in the first subset to one of the dual-input port photo detectors. An optical path couples a first output port of each one of the splitters that is not in the first subset to a dual-input port photo detector in the first subset of photo detectors. An optical path couples a second output signal of each one of the splitters that is not in the first subset to a dual-input port photo detector in the second subset of photo detectors.

A detector, in accordance with another embodiment of the present invention, includes, in part, a first splitter adapted to split an incoming optical signal into first and second optical signals, a first optical delay element adapted to delay the second optical signal to generate a delayed second optical signal, a second splitter adapted to split the delayed second optical signal to generate third and fourth optical signals, a first photo detector adapted to convert the first optical signal to generate a first electrical current signal, and a second photo detector adapted to convert the third optical signal to generate a second electrical current signal. The first photo detector has an anode terminal coupled to an output terminal of the detector and a second terminal coupled to a first supply voltage. The second photo detector has an anode terminal coupled to a second supply voltage and a cathode terminal coupled to the output terminal of the detector. The second supply voltage may be received from a ground terminal.

DETAILED DESCRIPTION OF THE INVENTION

An equalizer, in accordance with one embodiment of the present invention, operates as a high-pass filter to cancel out channel (link) attenuations at relatively high frequencies. The high-pass filter may be disposed anywhere in the channel, such as in the transmitter or receiver, or implemented through digital signal processing. In optical links, such high pass filter may be implemented using electro-optical components available in a typical silicon photonics process.

An electro-optical equalizer, in accordance with embodiments of the present invention, benefits from the high optical bandwidth and thus achieves more enhanced equalization than conventional equalizers that use only electrical components. The electrical components used in an electro-optical equalizer, in accordance with the present invention, eliminate the strong wavelength dependence of the narrow-band grating-based equalizers. The equalizer substantially improves the incoming optical signal directly before the signal is converted to an electrical signal and delivered to an integrated circuit adapted to recover the data. The equalizer is optically wideband and dispenses the need for retuning for different optical channels in a Wavelength Division Multiplexing (WDM) system.

Figure 1:
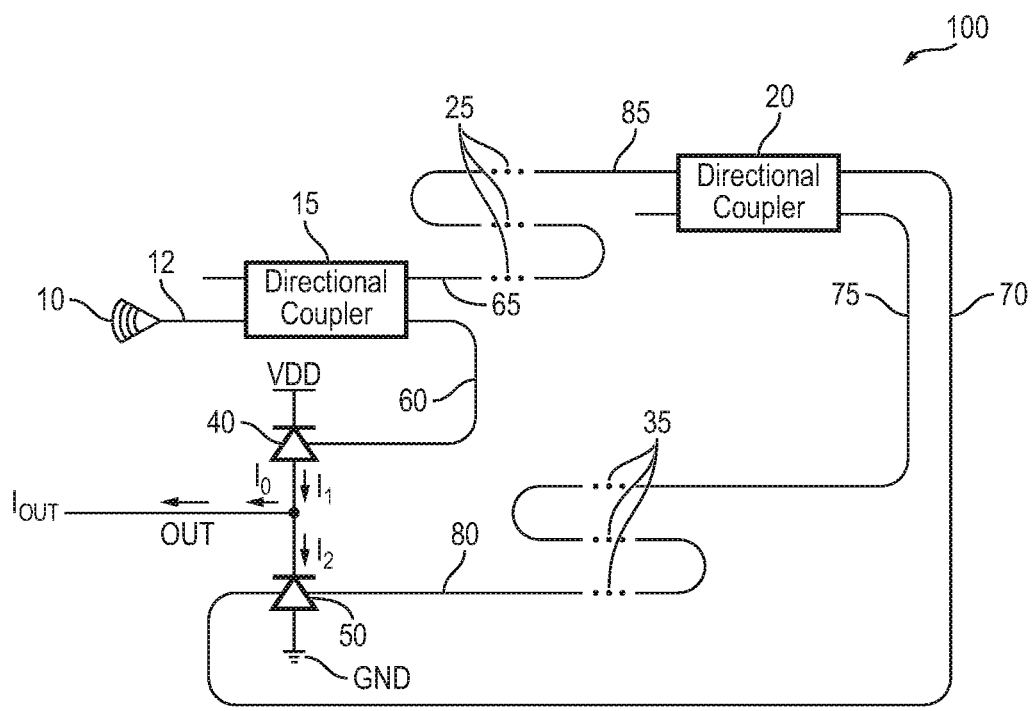
FIG. 1 is a simplified high-level block diagram of a self-equalizing photo detector, in accordance with one exemplary embodiment of the present invention.

FIG. 1 is a simplified high-level block diagram of a self-equalizing photo detector (alternatively referred to herein as SEPD, detector, or equalizer) 100 adapted to perform equalization, in accordance with one exemplary embodiment of the present invention. (SEPD) 100 is shown as including directional couplers 15, 20, optical delay elements 25, 35, and diodes 40, 50. Directional coupler 15 is adapted to receive optical signal 12 from a source, such as laser 10, and split the received optical signal into a pair of optical signals delivered to optical paths 60 and 65. The optical signal travelling in path 60 is delivered to photo diode 40. The optical signal travelling in path 65 is delayed by delay path 25 to generate signal 85—subsequently delivered to directional coupler 20. Directional coupler 20 is adapted split the received optical signal into a pair of optical signals delivered to optical paths 70 and 75. The optical signal travelling in path 70 is delivered to photo diode 50. The optical signal travelling in path 75 is delayed by delay path 35 to generate signal 80—subsequently delivered to photo diode 50. Photo diode 40 has a positive terminal coupled to output terminal OUT and a negative terminal coupled to supply voltage $V_{cc}$. Photo diode 50 has a positive terminal coupled to ground terminal GND and a negative terminal coupled to output terminal OUT.

In the following the terms optical signals and optical paths may be used interchangeably. Furthermore, for simplicity, the same reference number may be used to identify both the optical path through which a signal travels, as well as to the signal which travels through that path. For example, reference numeral 70 may be used to refer to the optical path so identified in FIG. 1, or alternatively to the signal which travels through this path. Furthermore, in the following, the terms splitter, coupler, or combiner are alternatively used to refer to an element adapted to split/divide a signal to generate more signals and/or couple/combine a multitude of signals to generate one or more signals. Such a component is also alternatively referred to herein as splitter/coupler.

Optical signal 60 supplied by directional coupler 15 represents a portion $W_1$ of input optical signal 12. In other words, the amplitude or power of optical signal 60 is $W_1$ times the amplitude or power of optical signal 12. Assuming no loss of optical power in directional coupler 15, the remaining power $(1-W_1)$ of optical signal 12 is delivered as optical signal 65. Optical signal 70 supplied by directional coupler 20 represents a portion $W_2$ of optical signal 85. Assuming no loss of optical power in directional coupler 20, the remaining power $(W_3=1-W_2)$ of optical signal 85 is delivered as optical signal 75.

Optical signal 60 is converted by photo diode 40 to electrical signal $I_1$ flowing from $V_{cc}$ to terminal OUT. Optical signals 70 and 80 are converted by photo diode 50 to electrical signal $I_2$ flowing from terminal OUT to the ground terminal. Therefore, current $I_{OUT}$ flowing in terminal OUT is defined by a difference between currents $I_1$ and $I_2$. To the extent that current $I_1$ is defined by the power of optical signal 60, and current $I_2$ is defined by the power of optical signals 70 and 80, output current $I_{OUT}$ is a filtered and equalized representation of optical signal 12.

Figure 2:
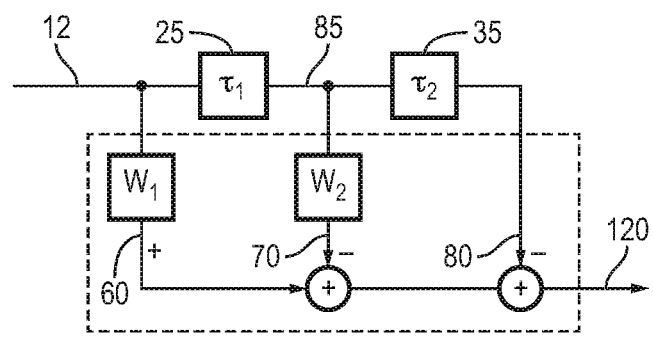
FIG. 2 is an equivalent schematic diagram of the filter represented by the self-equalizing photo detector of FIG. 1.

FIG. 2 is an equivalent schematic diagram of the filter represented by SEPD 100. A portion $W_1$ of input optical signal 12 is shown as providing a positive signal to summation node 120. The remaining portion of signal 12 is shown as being delayed by delay element 25 to generate signal 85. A portion $W_2$ of input optical signal 85 is represented by signal 70 being delivered as a negative signal to summation node 120. The remaining portion of signal 85 is delayed by delay element 35 to generate signal 80 which is also delivered as a negative signal to summation node 120.

Summation node 120 is represented by photo diodes 40 and 50. As is seen by a concurrent reference to FIGS. 1 and 2, portion (weight) $W_1$ of input optical signal 12, namely signal 60, is shown as supplying current to the output terminal OUT and thus is shown as a positive signal in FIG. 2. Signals 70 and 80, which respectively represent weights $W_2$ and $(1-W_2)$ of signal 85, are shown as drawing currents from output terminal OUT and thus are shown as negative signals in FIG. 2.

In one exemplary embodiment, SEPD 100 is a silicon photonic chip receiving optical signal 12 from laser 10 through a lensed grating coupler. In one embodiment, each of directional couplers 15, 20 is an imbalanced evanescent mode coupler. In one embodiment, each of photo diodes 40, 50 is a SiGe photodiode. In one example, laser 10 emits an optical signal having a wavelength of 1550 nm. In one example, each of optical delay elements 25, 35 generate a delay of 50 ps.

Assuming that the delays across optical delay elements 25, 35 are respectively represented by $\pi_1$ and $\pi_2$, and directional couplers 15, 25 respectively have coupling ratios of $a_1$ and $a_2$, the frequency response of the detector may be defined as:

$$I_{OUT}=RP(1-a_1)[1 W_1 e^{2i\pi\tau_1}-W_2 e^{2i\pi(\tau_1+\tau_2)}] \quad (1)$$

where R is the responsivity of the photo detectors, P is the optical power coupled into SEPD 100, and $$W_1 = \frac{(1-\alpha_2)\alpha_1}{1-\alpha_1}$$

$$W_2 = \frac{\alpha_1 \alpha_2}{1-\alpha_1}$$

Expression (1) represents the frequency response of a finite impulse response (FIR) filter showing the equalization characteristics of SPED 100. In one exemplary embodiment, SEPD 100 is a silicon photonic chip formed using an SOI process with silicon thickness of 220 nm on a 2 μm buried oxide layer. The SOI process includes a Ge epitaxial layer for forming the photo-detectors. In one embodiment, SEPD 100 receives optical signal 12 from laser 10 through a lensed grating coupler. In one embodiment, each of directional couplers 15, 20 is an imbalanced evanescent mode coupler. In one embodiment, each of photo diodes 40, 50 is a SiGe photodiode. In one example, laser 10 emits an optical signal having a wavelength of 1550 nm. In one embodiment, delay lines 25 and 35 are single-mode waveguides with group index of 4.2. In one example, each of optical delay elements 25, 35 generate a delay of 50 ps.

Figure 3:
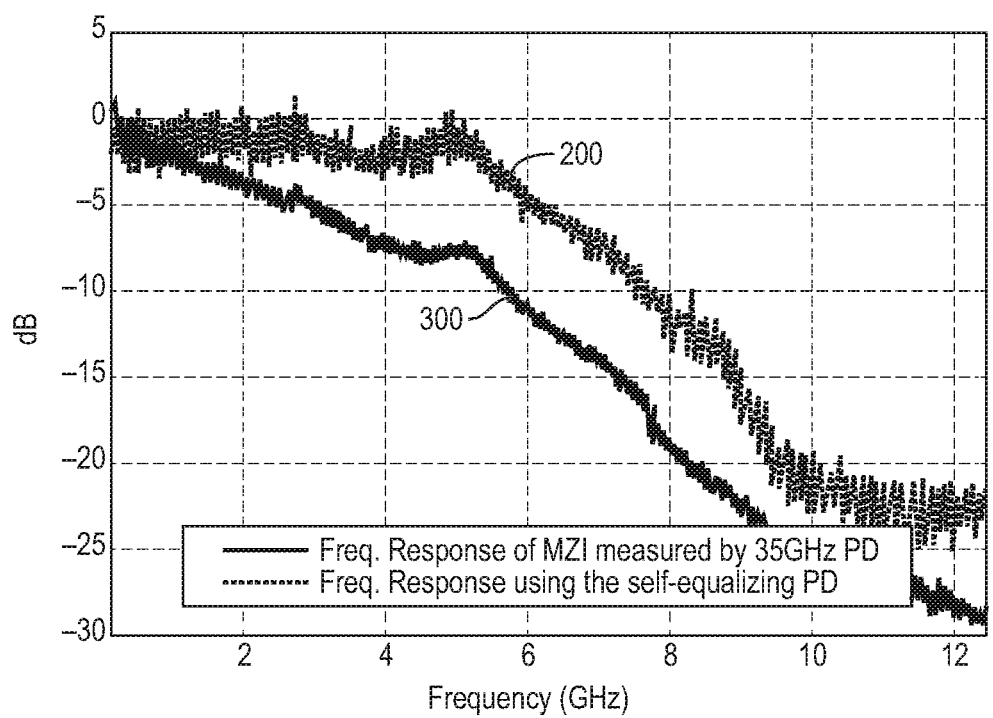
FIG. 3 shows plots of the frequency responses of an optical communication link using a conventional stand-alone photo detector, and a self-equalizing photo-detector, in accordance with one embodiment of the present invention.
Figure 4A:
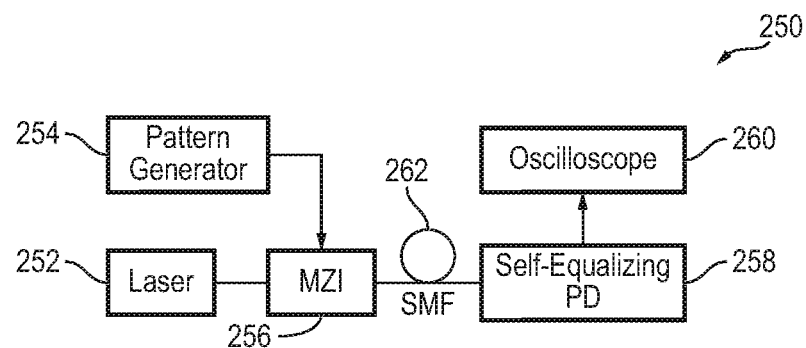
FIG. 4A is a block diagram of a measurement setup used to measure the frequency response of a self-equalizing photo-detector, in accordance with one embodiment of the present invention.

Plots 200 of FIG. 3 shows the overall frequency response of an optical communication link using a self-equalizing photo-detector (SEPD), in accordance with one embodiment of the present invention, using a 12.5 Gbps data link. FIG. 4A is a block diagram of a measurement setup 250 used to measure plot 200. As is seen from FIG. 4A, measurement set up 250 includes a laser 252, a pattern generator 254, a Mach-Zahnder modulator (MZI) 256, an SEPD 258, an oscilloscope 260, and single-mode fiber (SMF) 262. Response 200 includes the bandwidth limitation of MZI 256, an amplifier disposed between the pattern generator and the MZI (not shown for simplicity), and the electrical cables that connect the pattern generator to MZI 256, and SEPD 258 to the oscilloscope. The channel has an attenuation of 12.5 dB at the Nyquist frequency. FIG. 4A shows eye opening 280 of the eye diagram achieved using measurement setup 250.

Figure 4B:
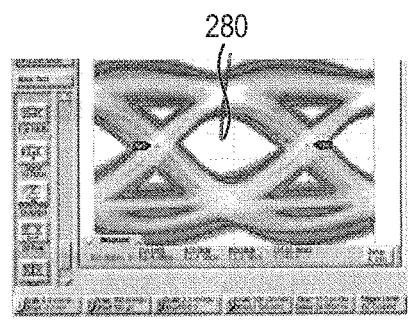
FIG. 4B is an eye diagram of the self-equalizing photo-detector obtained using the measurement setup shown in FIG. 4A.
Figure 5A:
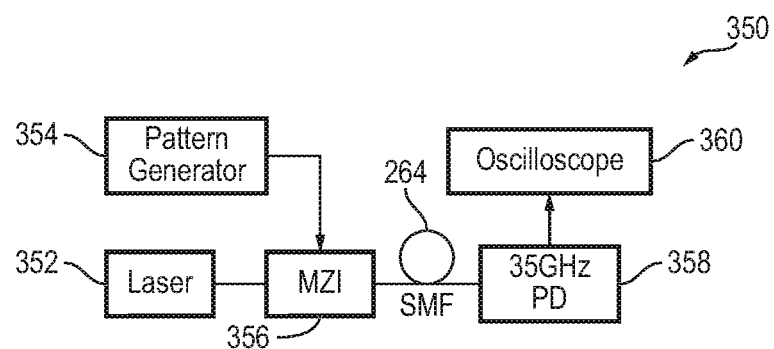
FIG. 5A is a block diagram of a measurement setup used to measure the frequency response of a conventional stand-alone photo detector.
Figure 5B:
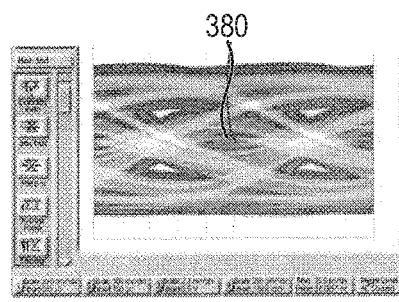
FIG. 5B is an eye diagram of a conventional stand-alone photo detector obtained using the measurement setup shown in FIG. 5A.

Plots 300 of FIG. 3 shows the overall frequency response of an optical communication link a conventional stand-alone 35 GHz photo-detector, using a 12.5 Gbps data link. FIG. 5A is a block diagram of a setup 350 used to measure plot 300. As is seen from FIG. 5A, set up 300 includes a laser 352, a pattern generator 354, a Mach-Zahnder modulator (MZI) 356, a conventional stand-alone 35 GHz photo-detector 358, an oscilloscope 360 and SMF 362. Response 300 includes the bandwidth limitation of MZI 356, an amplifier disposed between the pattern generator and the MZI (not shown for simplicity), and the electrical cables that connect the pattern generator to MZI 356, and the photo detector to the oscilloscope. The channel has an attenuation of 12.5 dB at the Nyquist frequency. FIG. 5B shows the eye opening 380 of the eye diagram achieved using measurement setup 350. Comparing FIGS. 4B and 5B, it is seen that the eye-opening 280 associated with a self-equalizing photo-detector, in accordance with embodiments of the present invention, is much wider than eye opening 380 of a conventional stand-alone GHz photo-detector. In other words, a self-equalizing photo-detector, in accordance with embodiments of the present invention, has a significantly improved optical signal equalization capability compared to conventional photo-detectors. A self-equalizing photo-detector, in accordance with embodiments of the present invention, thus achieves a higher rate of data transfer in bandwidth limited optical communication systems.

Figure 6:
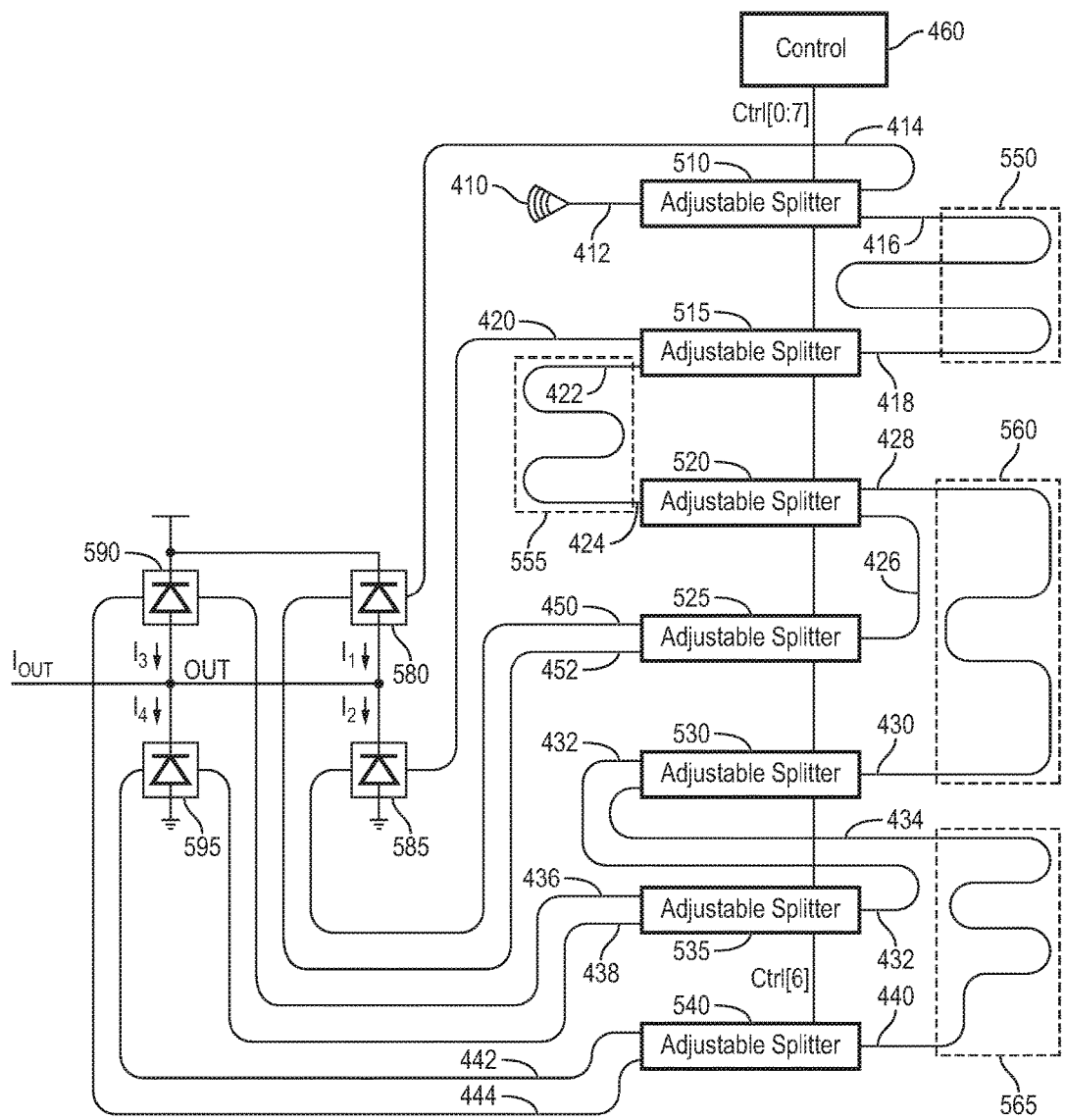
FIG. 6 is a simplified high-level block diagram of an adjustable self-equalizing photo detector adapted to perform equalization, in accordance with another exemplary embodiment of the present invention.
Figure 7:
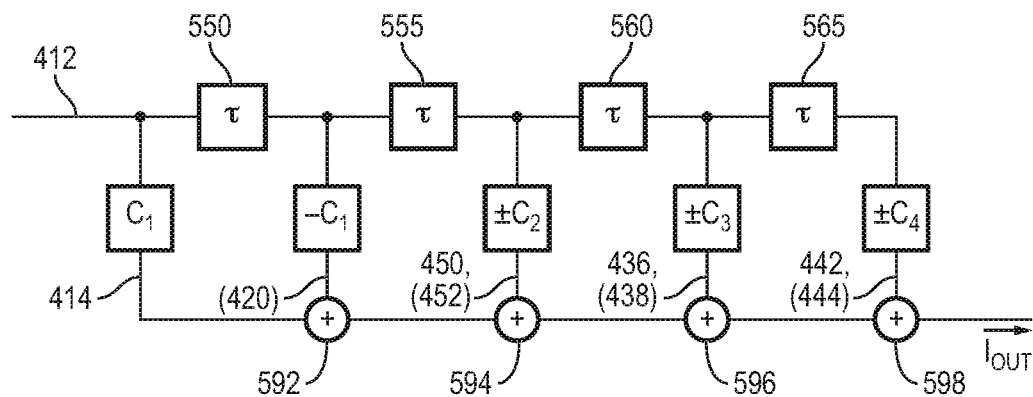
FIG. 7 is an equivalent schematic diagram of the filter represented by the adjustable self-equalizing photo detector of FIG. 6.

FIG. 6 is a simplified high-level block diagram of an adjustable self-equalizing photo detector (ASEPD) 400 adapted to perform equalization, in accordance with another exemplary embodiment of the present invention. FIG. 7 is an equivalent schematic diagram of the filter represented by ASEPD 400. ASEPD 400 is adapted to adjust for the equalization profile and level and hence may be used in different optical communication channels with different optical modulators, data rates, and trans-impedance amplifier bandwidths. Exemplary ASEPD 400 is shown as being a 4-tap feed-forward equalizer (FFE). It is understood, however, that an ASEPD, in accordance with embodiments of the present invention, may have any number taps. Furthermore, as described further below, to provide more flexibility in equalizing optical signals and to improve the versatility of the equalizer in attaining more complex frequency responses, the second, third, and fourth taps of ASEPD 400 have selectable signs. It is understood, however, that any one of the taps of an N-tap (N being an integer greater than one) feed-forward ASEPD, in accordance with embodiments of the present invention, may have selectable signs.

Referring to FIG. 6, ASEPD 400 is shown as including, in part, adjustable optical splitters 510, 515, 520, 525, 530, 535, 540, optical delay elements 550, 555, 560, 565, photo diodes 580, 585, 590, and 595, and control unit 460 generating a 7-bit control signal Ctrl[0:6] As is seen the optical splitters are coupled to one another in series thus forming a cascade of optical splitters. Each adjustable optical splitter is adapted to vary the portion of the optical power it delivers to its output ports in response to a control signal the adjustable optical splitter receives. Accordingly, adjustable optical splitter 510 is adapted to vary the amount of optical power it delivers to optical paths 414 and 416 from its respective output ports in response to the first bit, namely, Ctrl[0]. Likewise, adjustable optical splitter 540 is adapted to vary the amount of optical power it delivers to optical paths 442 and 444 from its respective output ports in response to the last bit, namely, Ctrl[6]. Optical delay lines 550, 555, 560, 565 are shown as delay elements in FIG. 7 and identified using the same reference numbers. Each adjustable optical splitter may vary the amount of optical power it delivers to its output ports from 0 to 1 in response to its associated control signal.

Adjustable splitter 510 is adapted to receive an optical signal 412 from a source, such as laser 410, and split the received optical signal into a pair of optical signals delivered to optical paths 414 and 416. In one embodiment, a grating coupler is used to couple the light from the optical fiber, receiving light from the laser, into the silicon photonics chip embodying ASEPD 400. The light in the optical fiber is shown as being supplied by laser 410.

The optical signal travelling in path 414 is delivered to photo diode 580. The signal travelling in path 416 is delayed by optical delay element 550 to generate optical signal 418, which is subsequently delivered to adjustable splitter 515. Adjustable splitter 515 is adapted split the received optical signal into a pair of optical signals delivered to optical paths 420 and 422. The optical signal travelling in path 420 is delivered to photo diode 585. The signal travelling in optical path 422 is delayed by delay element 555 to generate signal 424, which is subsequently delivered to adjustable splitter 520. Adjustable splitter 520 is adapted split the received optical signal into a pair of optical signals delivered to optical paths 426 and 428. Adjustable splitter 525 is adapted split optical signal 426 into a pair of optical signals 450 and 452 delivered respectively to photo diodes 580, 585. The optical paths are formed using waveguides.

The signal travelling in path 428 is delayed by optical delay element 560 to generate optical signal 430, which is subsequently delivered to adjustable splitter 530. Adjustable splitter 530 is adapted split the received optical signal 430 into a pair of optical signals delivered to optical paths 432 and 434. Adjustable splitter 535 is adapted split optical signal 432 into a pair of optical signals delivered respectively to dual-input photo diodes 590, 595 via optical paths 436 and 438. The signal travelling in optical path 434 is delayed by delay element 565 to generate signal 440, which is subsequently delivered to adjustable splitter 540. Adjustable splitter 540 is adapted to split optical signal 440 into a pair of optical signals delivered respectively to dual-input photo diodes 590, 595 via optical paths 442 and 444.

Dual-input port photo diodes 580, 590 are coupled in parallel, each having a positive terminal coupled to output terminal OUT and a negative terminal coupled to supply voltage $V_{cc}$. Dual-input port photo diodes 585, 595 are coupled in parallel, each having a positive terminal coupled to ground terminal GND and a negative terminal coupled to output terminal OUT.

Optical signals 414 and 452 are converted by dual-input port photo diode 580 to electrical signal $I_1$ flowing from $V_{cc}$ to terminal OUT. Optical signals 420 and 450 are converted by dual-input port photo diode 585 to electrical signal $I_2$ flowing from terminal OUT to the ground terminal. Optical signals 436 and 444 are converted by dual-input photo diode 585 to electrical signal $I_3$ flowing from $V_{cc}$ to terminal OUT. Optical signals 438 and 442 are converted by dual-input photo diode 595 to electrical signal $I_4$ flowing from terminal OUT to the ground terminal. Therefore, current $I_{OUT}$ flowing in terminal OUT is defined by:

$$I_{OUT} = (I_1 + I_2) - (I_3 + I_4)$$

Optical signal 414 supplied by adjustable splitter 510 represents a portion (weight) $C_0$ of input optical signal 412. In other words, the amplitude or power of optical signal 414 is $C_0$ times the amplitude or power of optical signal 412. Assuming no loss of optical power in adjustable splitter 510, the remaining power $(1-C_0)$ of optical signal 414 is delivered as optical signal 416. Optical signal 420 supplied by adjustable splitter 515 represents a portion $C_1$ of optical signal 418. Because optical signal 420 is delivered to photo diode 585 adapted to draw current $I_2$ from terminal OUT, $C_1$ is considered as having a negative value. In FIG. 7, $C_1$ is shown in parenthesis to indicate that it has a negative value and contributes negatively to output current $I_{OUT}$.

Optical signals 450 and 452 supplied by adjustable splitter 525 represents the same portion $C_2$ of input optical signal 426. Because optical signal 450 is delivered to photo diode 580 to generate a positive current $I_1$, it is represented in FIG. 7 by a positive weight $C_2$. Conversely, because optical signal 452 is delivered to photo diode 585 to draw current $I_2$ from terminal OUT (generate a negative current $I_2$), it is represented in FIG. 7 by a negative weight $C_2$ (shown in parenthesis). Optical signals 436 and 438 supplied by adjustable splitter 535 represents the same portion $C_3$ of input optical signal 432. Because optical signal 436 is delivered to photo diode 590 to generate a positive current $I_3$, it is represented in FIG. 7 by a positive weight $C_3$. Conversely, because optical signal 438 is delivered to photo diode 595 to generate a negative current $I_4$, it is represented in FIG. 7 by a negative weight $C_3$. Optical signals 442 and 444 supplied by adjustable splitter 540 represents the same portion $C_4$ of input optical signal 426. Because optical signal 444 is delivered to dual-input photo diode 590 to generate a positive current $I_4$, it is represented in FIG. 7 by a positive weight $C_4$. Conversely, because optical signal 442 is delivered to dual-input photo diode 595 to generate a negative current $I_4$, it is represented in FIG. 7 by a negative weight $C_4$.

As described above, adjustable splitter 510 is adapted to select weight $C_0$; adjustable splitter 515 is adapted to select weight $C_1$; adjustable splitters 520 is adapted to select weight $C_2$; and adjustable splitter 530 is adapted to select weights $C_3$ and $C_4$. Adjustable splitter 520 is adapted to set the weight $C_2$ either to a positive or a negative value. To select a positive value for weight $C_2$, splitter 525 causes optical signal 452 be delivered to dual-input photo diode 580 but inhibits the delivery of optical signal 450 to dual-input photo diode 585. Conversely, to select a negative value for weight $C_2$, splitter 525 inhibits the delivery of optical signal 452 to dual-input photo diode 580 but causes optical signal 450 to be delivered to dual-input photo diode 585. Adjustable splitters 535 and 540 are respectively adapted to set weights $C_3$ and $C_4$ either to positive or negative values in the same manner as described above with respect to adjustable splitters 525.

The sum of the signals generated by summing junctions 592, 594, 596 and 598 represents output current $I_{OUT}$. Since, the addition and/or subtraction of the signals are performed using electrical current signals, ASEPD 400 does not depend on the phase of the input optical signal and is thus optically wideband. The subtraction or addition of the current signals enables the attainment of peaking or notches at lower frequencies. Therefore, the response of the ASEPD 400 may be varied in accordance with the channel in which it is used.

Figure 8:
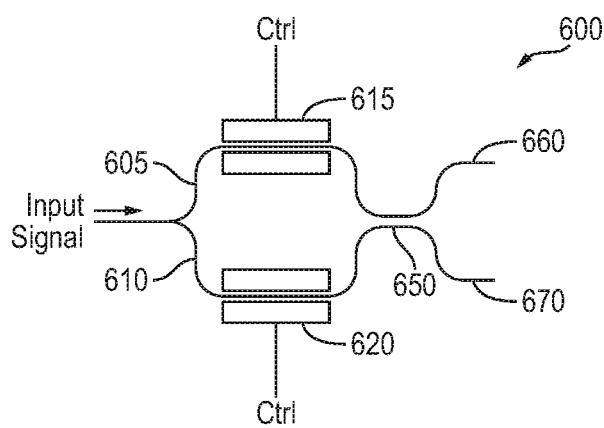
FIG. 8 is a schematic diagram of an exemplary embodiment of an adjustable optical splitter disposed in the adjustable self-equalizing photo detector of FIG. 6, in accordance with one exemplary embodiment of the present invention.

FIG. 8 is a schematic view of an exemplary embodiment of the adjustable splitter as used in ASEPD 400, in accordance with one exemplary embodiment of the present invention. As shown, the adjustable splitter includes a thermally tuned MZI supplying its output to a 50/50 coupler. Thermally tuned MZI 600, as shown in FIG. 8, includes a heater in each of its arms to control the phase of the optical signal travelling in that arm. Heater 615 controls the phase of the optical signal traveling through arm 605 of the MZI and heater 615 controls the phase of the optical signal traveling through arm 610 of the MZI. By controlling the heat in the MZI arms and thus the relative phases of the optical signals travelling in the arms, the amount of the optical power delivered to output ports 660 and 670 of the adjustable splitter may be varied from 0 to 1. In one embodiment, resistive elements may be used to heat the MZI arms. In yet other embodiments, P-I-N or P-N diodes may be used to control the relative phases of the optical signals travelling thought the arms of the MZI. It is understood that any other technique capable of changing the phase of an optical signal by varying the refractive index of the waveguide through which the optical signal travels, may also be used. By varying the relative phases of the optical signals travelling thought arms 605 and 610 of the MZI, the ratio of the intensity (power per unit area) of the light delivered to output ports 660 and 670 of adjustable splitter 600 may be varied from 0 to 1, thereby enabling control of the filter weights $C_0$, $C_1$, $C_2$, $C_3$ and $C_4$ of ASEPD 400 shown in FIGS. 6 and 7.

Figure 9:
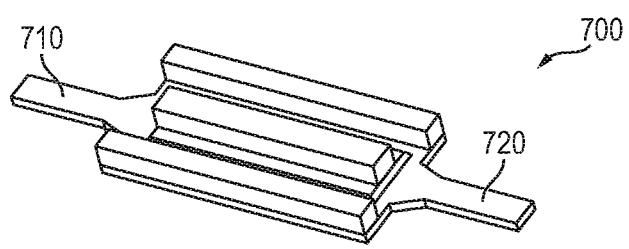
FIG. 9 is a perspective layout view of an exemplary embodiment of a dual-input photo diode as used in the adjustable self-equalizing photo detector of FIG. 6, in accordance with one exemplary embodiment of the present invention.

FIG. 9 is a perspective layout view of an exemplary embodiment of a dual-input photo diode as used in ASEPD 400, in accordance with one exemplary embodiment of the present invention. The dual-input photo diode is shown as being a vertical SiGe photo diode with two optical input ports 710 and 720. Since each dual-input port photo-diode has two inputs, fewer photo diodes are used in ASEPD 400 thereby resulting in a lower total capacitance at the output terminal. In order to reduce the output terminal junction capacitance further, in one embodiment, the sizes of the dual-input-port photo diodes coupled to higher order taps (e.g., taps receiving weight $C_3$) are reduced.

Figure 10A:
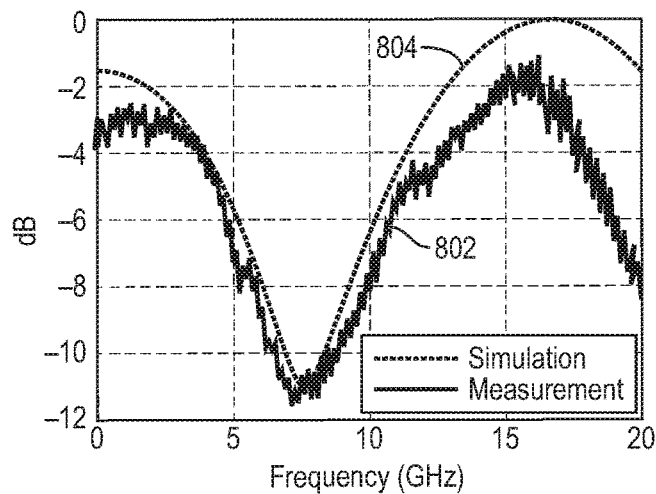
FIG. 10A shows a plot of a simulated as well as measured frequency response of an adjustable self-equalizing photo detector using a first multitude of filter weights and delays, in accordance with one exemplary embodiment of the present invention.

Plot 802 of FIG. 10A shows a measured frequency response of ASEPD 400 when weights (filter coefficients) $C_0$, $C_1$, $C_2$, $C_3$, and $C_4$ are respectively selected to have values of 0.6, 0.08, −0.32, 0, 0, and each of delay elements 550, 555, 560 and 565 is selected to have a value of 30 ps. The faster roll off of the frequency response at around 18 GHz is due to the limited bandwidth of the dual-input port photo diodes. The frequency response shown in plot 802 accounts for the frequency response of the modulator and cables used in the measurement setup. Plot 804 of FIG. 10A shows a simulated frequency response of an ideal filter having the same filter coefficients and delays as the filter used in measuring plot 802.

Figure 10B:
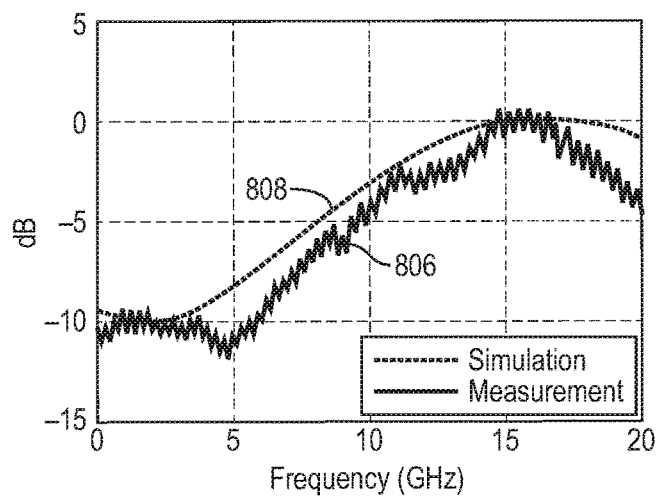
FIG. 10B shows a plot of a simulated as well as measured frequency response of an adjustable self-equalizing photo detector using a second multitude of filter weights and delays, in accordance with one exemplary embodiment of the present invention.

Plot 806 of FIG. 10B shows a measured frequency response of ASEPD 400 when weights (filter coefficients) $C_0$, $C_1$, $C_2$, $C_3$, and $C_4$ are respectively selected to have values of 0.55, 0.34, −0.11, 0, 0, and each of delay elements 550, 555, 560 and 565 is selected to have a values of 30 ps. The frequency response shown in plot 802 accounts for the frequency response of the modulator and cables used in the measurement setup. Plot 808 of FIG. 10B shows a simulated frequency response of an ideal filter having the same filter coefficients and delays as the filter used in measuring plot 806.

Figure 10C:
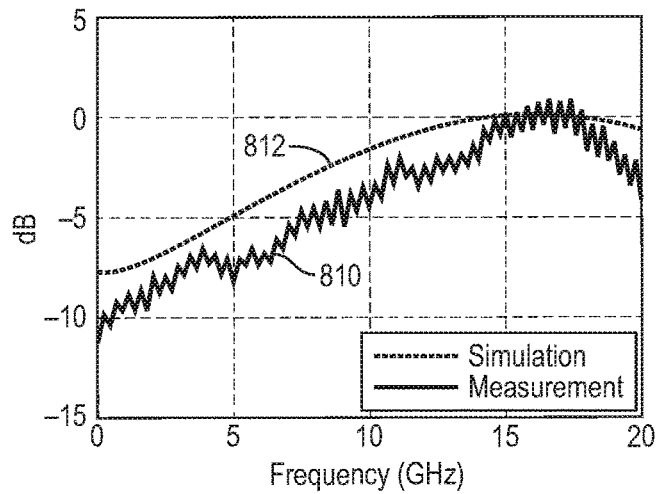
FIG. 10C shows a plot of a simulated as well as measured frequency response of an adjustable self-equalizing photo detector using a third multitude of filter weights and delays, in accordance with one exemplary embodiment of the present invention.

Plot 810 of FIG. 10C shows a measured frequency response of ASEPD 400 when weights (filter coefficients) $C_0$, $C_1$, $C_2$, $C_3$, and $C_4$ are respectively selected to have values of 0.7, 0.3, 0, 0, 0, and each of delay elements 550, 555, 560 and 565 is selected to have a value of 30 ps. The frequency response shown in plot 810 accounts and thus compensates for the frequency response of the modulator and cables used in the measurement setup. Plot 812 of FIG. 10C shows a simulated frequency response of an ideal filter having the same filter coefficients and delays as the filter used in measuring plot 810.

Figures 11A, 11B:
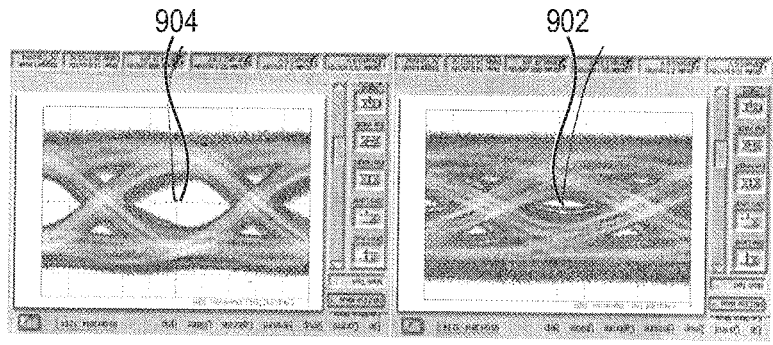
FIG. 11A shows the eye diagram of a conventional photo diode measured at the bit rate of 25 Gbps, as known in the prior art.
FIG. 11B shows the eye diagram of an adjustable self-equalizing photo detector, in accordance with embodiments of the present invention, measured at the bit rate of 25 Gbps.

FIG. 11A shows the eye diagram of a conventional 35 GHz bandwidth Photo diode at 25 Gbps. A 12.5 Gbps optical modulator is used to modulate the optical signal from a distributed feed-back laser operating at 25 Gbps. As is seen from FIG. 11A, eye 902 is substantially closed. FIG. 11B shows the eye diagram achieved at the same bit rate of 25 Gbps, when an ASEPD 400 (having the same coefficients as those used in generating plot 810 of FIG. 10C) is used in place of the conventional photo diode. As is seen from FIG. 11B, eye 904 is substantially wider and more open than eye 902 of FIG. 11A. The substantially more open eye 904 of FIG. 11B enables the use of a lower speed modulator at higher data rates.

Figures 12A, 12B:
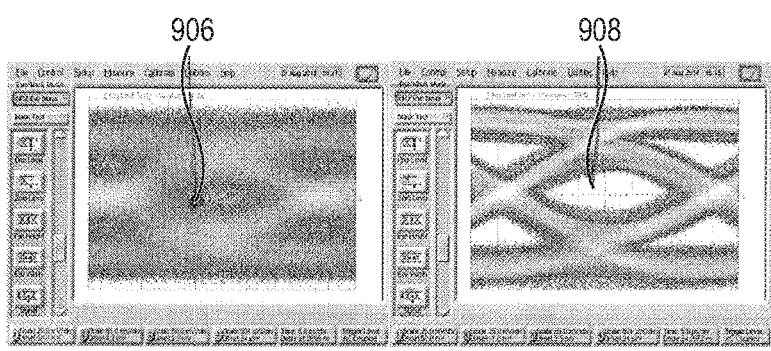
FIG. 12A shows the eye diagram of a conventional photo diode measured at the bit rate of 12.5 Gbps, as known in the prior art.
FIG. 12B shows the eye diagram of an adjustable self-equalizing photo detector, in accordance with embodiments of the present invention, measured at the bit rate of 12.5 Gbps.

FIG. 12A shows the eye diagram of a conventional 35 GHz bandwidth Photo diode at 12.5 Gbps. A 4-inch FR4 (a form of PCB substrate used for making electronic boards) trace is used prior to the 12.5 Gbps modulator in order to emulate a different channel and provide attenuation. As is seen from FIG. 12A, eye 906 is closed. FIG. 12B shows the eye diagram achieved at the same bit rate of 12.5 Gbps, when an ASEPD 400 (having the same coefficients as those used in generating plot 810) is used in place of the conventional photo diode. As is seen from FIG. 12B, eye 908 is substantially wider and more open than eye 906 of FIG. 12A.

Figure 13:
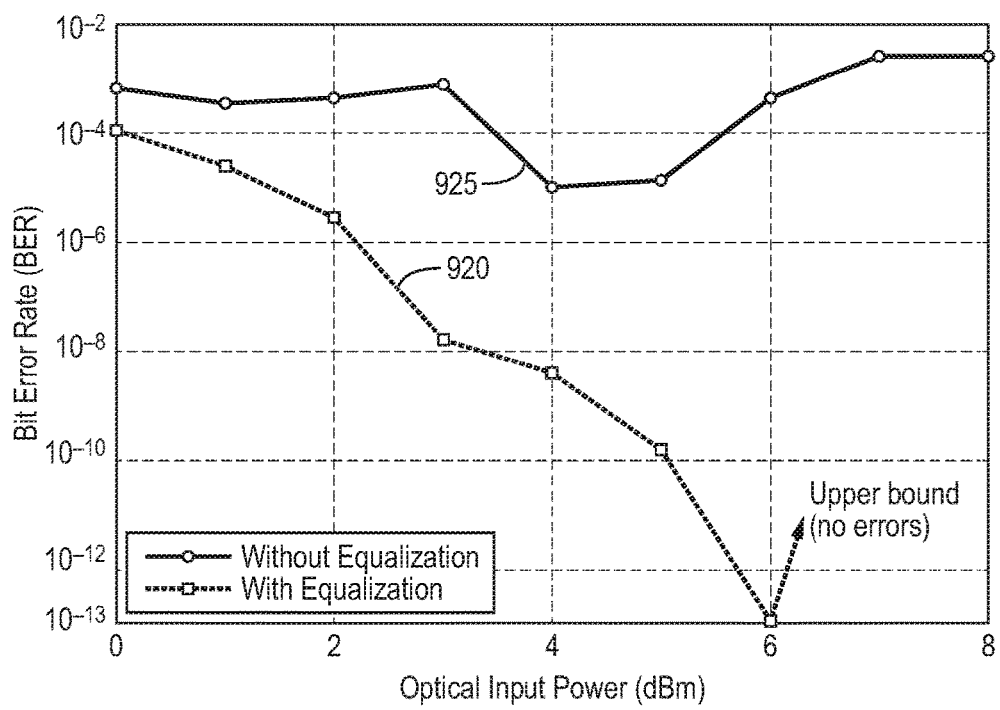
FIG. 13 shows the bit error rates achieved when an adjustable self-equalizing photo detector, in accordance with embodiments of the present invention, disposed in a system is turned on and off.

Plots 920 of FIG. 13 shows the bit error rate as a function of the optical input power at a data rate of 12 Gbps when the ASEPD disposed in the system is turned off and thus no equalization is used. Plots 925 of FIG. 13 shows the bit error rate as a function of the optical input power at a data rate of 12 Gbps when the ASEPD disposed in the system and having the same coefficients as those used in generating plot 810 is turned on to achieve equalization. As is seen, from plot 925, a BER higher than $10^{-13}$ is achieved, when the ASEPD, in accordance with embodiments of the present invention, is turned on. In one embodiment, ASEPD is an integrated circuit formed using an SOI process with 220 nm silicon layer and a Ge epitaxial layer for photo-detectors. Including all the pads and the electronics connections, the integrated circuit occupies an area of 1.5×0.5 mm².

The above embodiments of the present invention are illustrative and not limitative. Embodiments of the present invention are not limited by the number of splitters, adjustable or otherwise, waveguides, delay elements or optical-to-electrical signal converter disposed in the self-equalizing photo detector. Embodiments of the present invention are not limited by the type of phase modulator, Mach-Zahnder or otherwise, used in each optical splitter. Embodiments of the present invention are not limited by the type of substrate, semiconductor, flexible or otherwise, in which various components of a self-equalizing photo detector in accordance with the present invention may be embodied. Other additions, subtractions or modifications are obvious in view of the present disclosure and are intended to fall within the scope of the appended claims.

What is claimed is:

1. A detector comprising:
   a first optical splitter adapted to split a first optical signal into second and third optical signals;
   a first optical delay element adapted to delay the second optical signal to generate a fourth optical signal;
   a second optical splitter adapted to split a signal representative of the fourth optical signal to generate fifth and sixth optical signals;
   a first photo detector adapted to receive the third optical signal via a first optical path, said first photo detector having an anode terminal coupled to an output terminal of the detector and a second terminal coupled to a first supply voltage; and
   a second photo detector adapted to receive the sixth optical signal via a second optical path, said second photo detector having an anode terminal coupled to a second supply voltage and a cathode terminal coupled to the output terminal of the detector.

2. The detector of claim 1 wherein said first photo detector is further adapted to receive the fifth optical signal via a third optical path.

3. The detector of claim 1 wherein each optical splitter is an adjustable optical splitter, the detector further comprising:
   a control unit controlling an amount of optical power delivered by the first optical splitter to the second and third and optical signals.

4. The detector of claim 3 wherein said control unit is further adapted to cause the second optical splitter to select between the delivery of either the fifth optical signal to the first photo detector or the sixth optical signal to the second photo detector.

5. The detector of claim 3 wherein said first photo detector is a dual-port photo detector adapted to receive the third optical signal from a first input port disposed along a first side of the photo detector, and the fifth optical signal from a second input port disposed along a second side of the photo detector.

6. The detector of claim 1 wherein each of said first and second splitters is a directional coupler/splitter.

7. The detector of claim 3 wherein each of the first and second optical splitters comprises a Mach-Zander interferometer.

8. The detector of claim 7 wherein each of the first and second optical splitters comprises a first resistive element adapted to heat a first arm of the Mach-Zander interferometer disposed in the optical splitter, and a second resistive element adapted to heat a second arm of the Mach-Zander interferometer disposed in the optical splitter, said first and second resistive elements being responsive to the control unit.

9. The detector of claim 7 wherein each of the first and second optical splitters comprises a P-I-N diode adapted to change relative phases of the optical signals traveling in first and second arms of the Mach-Zander interferometer disposed in the optical splitter in response to the control unit.

10. The detector of claim 9 wherein each of the first and second optical splitters comprises a P-N diode adapted to change relative phases of the optical signals traveling in first and second arms of the Mach-Zander interferometer disposed in the optical splitter in response to the control unit.

11. The detector of claim 1 further comprising:
a grating coupler adapted to receive and couple the first optical signal to the detector.

12. The detector of claim 1 wherein said detector is integrated in a semiconductor substrate.

13. The detector of claim 11 wherein said first optical signal is received from a laser.

14. A detector comprising:
a plurality of optical splitters coupled to one another in series, each optical splitter comprising at least first and second output ports, wherein each of a first subset of the plurality of optical splitters is adapted to vary an amount of optical power the optical splitter delivers to a first one of its output ports in response to a control signal the optical splitter receives, wherein each optical splitter that is not in the first subset is adapted to deliver an optical signal either to its first output port or to its second output port in response to a control signal the optical splitter receives;
a plurality of optical delay elements disposed between the plurality of optical splitters to delay optical signals travelling therebetween;
a plurality of dual-input port photo detectors, each of a first subset of the plurality of dual-input port photo detectors adapted to supply an electrical current to an output terminal of the detector in response to a received optical signal, each of a second subset of the plurality of dual-input port photo detectors adapted to draw an electrical current from the output terminal of the detector in response to a received optical signal;
at least one optical path coupling an output port of one of the plurality of splitters in the first subset of the plurality of optical splitters to one of the plurality of dual-input port photo detectors in the first subset of the plurality of dual-input port photo detectors;
a first plurality of optical paths each coupling a first output port of each one of the plurality of splitters that is not in the first subset of the plurality of optical splitters to one of the dual-input port photo detectors in the first subset of the plurality of dual-input port photo detectors; and
a second plurality of optical paths each coupling a second output port of each one of the plurality of splitters that is not in the first subset of the plurality of optical splitters to one of the dual-input port photo detectors in the second subset of the plurality of dual-input port photo detectors.

15. The detector of claim 14 wherein each of the plurality of optical splitters comprises a Mach-Zander interferometer.

16. The detector of claim 15 wherein each of the plurality of optical splitters comprises a first resistor adapted to heat a first arm of the Mach-Zander interferometer disposed in the optical splitter, and a second resistor adapted to heat a second arm of the Mach-Zander interferometer disposed in the optical splitter.

17. The detector of claim 15 wherein each of the plurality of optical splitters comprises a P-I-N diode adapted to change relative phases of the optical signals traveling in first and second arms of the Mach-Zander interferometer disposed in the optical splitter.

18. The detector of claim 15 wherein each of the plurality of optical splitters comprises a P-N diode adapted to change relative phases of the optical signals traveling in first and second arms of the Mach-Zander interferometer disposed in the optical splitter.

19. The detector of claim 14 further comprising:
a grating coupler adapted to receive and couple an incoming optical signal to the detector.

20. The detector of claim 14 wherein each of said plurality of dual-input port photo detectors is adapted to receive a first optical signal from a first input port disposed along a first side of the dual-input port photo detector, and a second optical signal from a second input port disposed along a second side of the dual-input port photo detector.

21. The detector of claim 14 wherein said detector is integrated in a semiconductor substrate.

22. A method of equalizing a signal, the method comprising:
splitting a first optical signal into second and third optical signals;
delaying the second optical signal to generate a fourth optical signal;
splitting a signal representative of the fourth optical signal to generate fifth and sixth optical signals;
providing a first optical path for carrying the third optical signal to a first photo detector having an anode terminal coupled to an output terminal of the detector and a second terminal coupled to a first supply voltage; and
providing a second optical paths for carrying the sixth optical signal to a second photo detector having an anode terminal coupled to a second supply voltage and a cathode terminal coupled to the output terminal of the detector.

23. The method of 22 claim further comprising:
providing a third optical path for carrying the fifth optical signal to the first photo detector.

24. The method of 22 claim further comprising:
varying an amount of optical power of the second and third and optical signals.

25. The method of 24 claim further comprising:
selecting between delivery of either the fifth optical signal to the first photo via the second optical path, or delivery of the sixth optical signal to the second photo detector via the third optical path.

26. The method claim 24 wherein said first photo detector is a dual-port photo detector adapted to receive the third optical signal from a first input port disposed along a first side of the photo detector, and the fifth optical signal from a second input port disposed along a second side of the photo detector.

27. The method of 22 further comprising:
splitting the first optical signal into the second and third optical signals via a directional coupler/splitter.

28. The method of 22 further comprising:
splitting the first optical signal into the second and third optical signals via a first Mach-Zander interferometer; and
splitting the fourth optical signal into the fifth and sixth optical signals via a second Mach-Zander interferometer.

29. The method of 28 further wherein each of the first and second optical splitters comprises a first resistive element adapted to heat a first arm of the Mach-Zander interferometer disposed in the optical splitter, and a second resistive element adapted to heat a second arm of the Mach-Zander interferometer disposed in the optical splitter.

30. The method of 22 further comprising:
splitting the first optical signal into the second and third optical signals via one or more P-I-N diodes; and
splitting the fourth optical signal into the fifth and sixth optical signals via one or more P-I-N diodes.

31. The method of 22 further comprising:
splitting the first optical signal into the second and third optical signals via one or more P-N diodes; and
splitting the fourth optical signal into the fifth and sixth optical signals via one or more P-N diodes.

32. The method of claim 22 wherein said equalization method is performed using an equalizer integrated in a semiconductor substrate.

33. The method of claim 22 further comprising:
receiving the first optical signal from a laser via a grating coupler.

34. A method of equalizing a signal, the method comprising:
varying an amount of power of a first optical signal delivered to an output port of each of a first plurality of optical splitters;
supplying a second optical signal to either a first output port or a second output port of each of a second plurality of optical splitters;
delaying at least one of the first and second optical signals;
delivering an output signal of at least one of the first plurality of optical splitters to one of a first plurality of dual-input port photo detectors;
delivering an output signal of each of a first subset of the second plurality of optical splitters to a different one of the first plurality of dual-input port photo detectors;
delivering an output signal of each of a second subset of the second plurality of optical splitters to a different one of a second plurality of dual-input port photo detectors, the first plurality of dual-input port photo detectors adapted to supply an electrical current to an output terminal, and the second plurality of dual-input port photo detectors adapted to draw an electrical current from the output terminal.

35. The method of claim 34 wherein each of the first and second plurality of optical splitters comprises a Mach-Zander interferometer.

36. The method of claim 35 wherein each of the first and second plurality of optical splitters comprises a first resistor adapted to heat a first arm of the Mach-Zander interferometer disposed in the optical splitter, and a second resistor adapted to heat a second arm of the Mach-Zander interferometer disposed in the optical splitter.

37. The method of claim 35 wherein each of the first and second plurality of optical splitters comprises a P-I-N diode adapted to change relative phases of the optical signals traveling in first and second arms of the Mach-Zander interferometer disposed in the optical splitter.

38. The method of claim 35 wherein each of the first and second plurality of optical splitters comprises a P-N diode adapted to change relative phases of the optical signals traveling in first and second arms of the Mach-Zander interferometer disposed in the optical splitter.

39. The method of claim 34 further comprising:
coupling an incoming optical signal to a first one of the first plurality of optical splitters via a grating coupler.

40. The method of claim 34 wherein each of said first and second plurality of dual-input port photo detectors is adapted to receive a first optical signal from a first input port disposed along a first side of the dual-input port photo detector, and a second optical signal from a second input port disposed along a second side of the dual-input port photo detector.

41. The method of claim 22 wherein said equalization is performed using an equalizer integrated in a semiconductor substrate.

42. A detector comprising:
a first splitter adapted to split an incoming optical signal into first and second optical signals;
a first optical delay element adapted to delay the second optical signal to generate a delayed second optical signal;
a second splitter adapted to split the delayed second optical signal to generate third and fourth optical signals;
a first photo detector adapted to convert the first optical signal to generate a first electrical current signal, said first photo detector having an anode terminal coupled to an output terminal of the detector and a second terminal coupled to a first supply voltage; and
a second photo detector adapted to convert the third optical signal to generate a second electrical current signal, said second photo detector having an anode terminal coupled to a second supply voltage and a cathode terminal coupled to the output terminal of the detector.

43. The detector of claim 42 further comprising:
a second delay element adapted to delay the fourth optical signal to generate a delayed fourth optical signal, wherein the second photo detector is adapted to convert the delayed fourth optical signal to an electrical current signal.

44. A method of equalizing a signal, the method comprising:
splitting an incoming optical signal into first and second optical signals;
delaying the second optical signal to generate a delayed second optical signal;
splitting the delayed second optical signal to generate third and fourth optical signals;
converting the first optical signal to a first electrical current signal delivered to an output terminal; and
converting the third optical signal to a second electrical current signal drawn from the output terminal.

45. The method of claim 16 further comprising:
delaying the fourth optical signal to generate a delayed fourth optical signal;
converting the delayed fourth optical signal to the second electrical current signal.

* * * * *